Sept. 2, 1924.

W. H. MULLOY 1,506,989

SAFETY FENDER FOR AUTOMOBILES

Filed Jan. 7, 1924

Inventor:
William H. Mulloy.

By Edward E. Logan
Attorney.

Patented Sept. 2, 1924.

1,506,989

UNITED STATES PATENT OFFICE.

WILLIAM H. MULLOY, OF ST. LOUIS, MISSOURI.

SAFETY FENDER FOR AUTOMOBILES.

Application filed January 7, 1924. Serial No. 684,885.

*To all whom it may concern:*

Be it known that I, WILLIAM H. MULLOY, a citizen of the United States, and resident of the city of St. Louis and State of Missouri, have invented certain new and useful Improvements in Safety Fenders for Automobiles, of which the following is a specification containing a full, clear, and exact description, reference being had to the accompanying drawings, forming a part thereof.

My invention relates to improvements in safety fenders for automobiles and has for its primary object a fender designed to be mounted in front of an automobile so that when a pedestrian is struck instead of being thrown forward to the pavement, he will be toppled over backward and caught by the fender and thereby be saved from serious injury.

A further object is to construct a safety fender which is resiliently mounted on the chassis so that shocks imparted to the fender will be cushioned.

In the drawings:—

Figure 1:
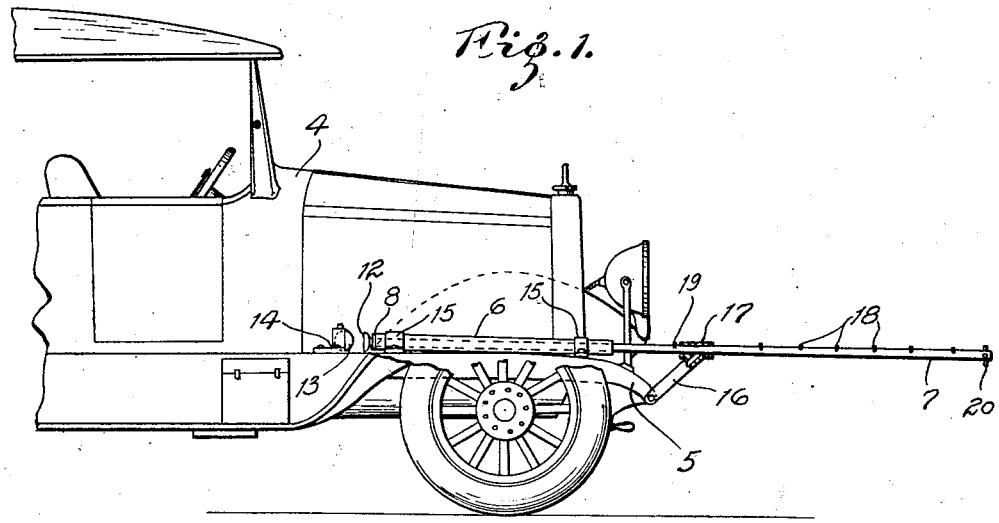
Fig. 1 is a fragmental side view of an automobile with my device attached thereto.
Figure 2:
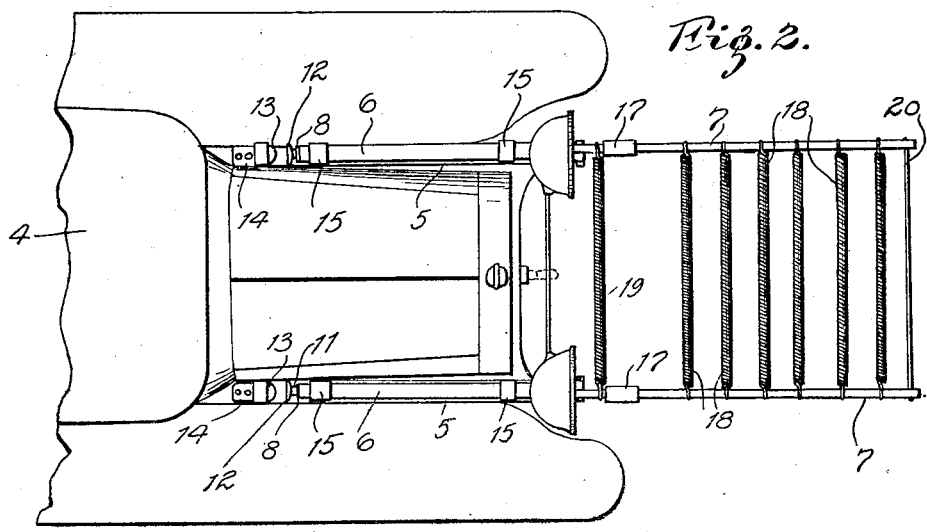
Fig. 2 is a top plan view of the same.
Figure 3:
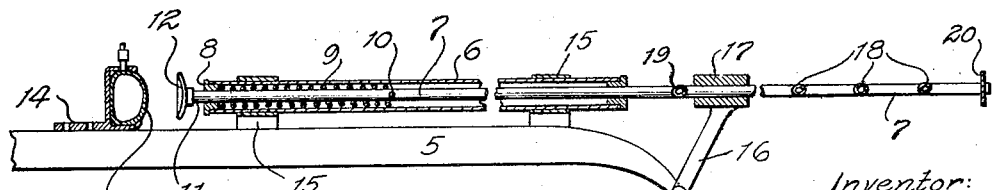
Fig. 3 is an enlarged longitudinal section of one of the side members showing the means of accomplishing the cushioning due to bumps.

In the construction of my device I make use of an automobile 4 which is provided with the usual chassis frame 5. Secured to this frame and on either side of the hood are hollow members 6 through which a rod 7 extends. The hollow member 6 is closed on its rear end by means of a plug 8 through which the rod 7 extends. The rod 7 is surrounded by a coil spring 9, one end of which rests against the plug 8, the other end being in contact with a pin 10 carried by the rod 7.

Secured to the end 11 of the rod 7 is a disk 12 which is preferably made concave and which is designed to come in contact with a pneumatic bumper 13 which is carried by a bracket 14. This bracket is also secured to the chassis frame and at some distance to the rear of the plate 12 so that when the rod 7 receives a jolt the spring 9 will first be compressed and thus partially cushion the shock before the plate 12 contacts with the bumper 13 for the final cushioning. This double cushioning it is believed will prevent the bumper from being torn loose in the event of a collision.

The tubes 6 are preferably secured to the chassis frame by means of loops 15. Secured to the front of the chassis frame is a bracket 16 which is provided on its free end with a hollow sleeve 17 through which the rod 7 passes. Secured to the rods 7 and extending between these rods is a plurality of resilient members such as coil springs 18. These springs may be either rigidly or removably secured to the rods.

Immediately in front of the automobile is a coil spring 19, this coil spring has at least one end removably attached to the rods 7 so that it can be unhooked. The purpose of this unhooking is to permit the driver to get between the rods 7 for the purpose of cranking the machine when necessary.

The forward end of the rods 7 are connected together by a heavy rubber band 20. My purpose of placing the rubber band across the front is that it is less likely to bruise or injure a pedestrian when struck by a machine traveling relatively fast, than coil springs would be.

It is my intention to have the fender project sufficiently far in front of the automobile so that when a person is struck and falls upon the fender there will be little likelihood of his head striking the radiator. By the use of my device a pedestrian when in the path of a moving automobile is struck, the blow will be either at the knee or below. This will have a tendency to push his feet out from under him and cause the body to topple backward on to the fender. With the present bumpers in use the pedestrian is struck almost simultaneously by the bumper and radiator and thrown forward. This manner of throwing the pedestrian when struck almost invariably leads to serious head injuries and quite frequently other serious bodily injury, because the pedestrian is thrown violently upon the roadway whereas with my device the pedestrian falls on the resilient members and will in all probabilities escape with very slight bruises otherwise no other physical injuries.

Having fully described my invention, what I claim is:—

1. A safety fender for automobiles comprising in combination with an auto chassis frame of a sleeve secured to each side of said frame, a second sleeve carried by said frame and located in front of the first mentioned sleeve, a rod slidably mounted in and extending through each set of sleeves, and a plurality of resilient members secured to said rods, said members adapted to extend from rod to rod.

2. A safety fender for automobiles comprising in combination with an auto chassis frame of a sleeve carried by each side of said frame, a second sleeve carried by said frame in longitudinal alinement with said first mentioned sleeve, a rod slidably mounted in each pair of sleeves, a plurality of resilient spaced apart members secured to said rods, shock absorbing means adapted to cushion end thrust of said rods, and pneumatic means for limiting the rearward movement of said rods.

3. A safety fender for automobiles the combination with an auto chassis frame of a sleeve secured to each side of said frame adjacent its front, a rod slidably mounted in each of said sleeves and projecting therethrough, a coil spring surrounding each of said rods and located in said sleeve, a pneumatic bumper carried by said chassis frame to the rear of said rod, and a plurality of resilient members carried by said rods, said resilient members being spaced apart and extending from rod to rod.

In testimony whereof, I have signed my name to this specification.

WILLIAM H. MULLOY.